United States Patent
Huss et al.

(10) Patent No.: US 10,389,491 B2
(45) Date of Patent: Aug. 20, 2019

(54) IMPLEMENTATION OF HARQ ON PUSCH FOR MULTIPLE CARRIERS

(71) Applicant: Telefonaktiebolaget LM Ericsson (publ), Stockholm (SE)

(72) Inventors: Fredrik Huss, Sundbyberg (SE); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 146 days.

(21) Appl. No.: 15/543,177

(22) PCT Filed: Feb. 9, 2016

(86) PCT No.: PCT/SE2016/050096
§ 371 (c)(1),
(2) Date: Jul. 12, 2017

(87) PCT Pub. No.: WO2016/130073
PCT Pub. Date: Aug. 18, 2016

(65) Prior Publication Data
US 2018/0006771 A1    Jan. 4, 2018

Related U.S. Application Data

(60) Provisional application No. 62/113,745, filed on Feb. 9, 2015.

(51) Int. Cl.
*H04W 4/00*    (2018.01)
*H04L 1/18*    (2006.01)
(Continued)

(52) U.S. Cl.
CPC .......... *H04L 1/1861* (2013.01); *H04L 1/0003* (2013.01); *H04L 1/1896* (2013.01); *H04L 5/001* (2013.01)

(58) Field of Classification Search
CPC ..... H04L 1/1861; H04L 5/001; H04L 1/0003; H04L 1/1896
(Continued)

(56) References Cited

U.S. PATENT DOCUMENTS

2011/0310823 A1* 12/2011 Nam ...................... H04L 1/0073
370/329
2013/0301550 A1* 11/2013 Kim ....................... H04W 72/02
370/329

(Continued)

OTHER PUBLICATIONS

Author Unknown, "Technical Specification Group Radio Access Network; Evolved Universal Terrestrial Radio Access (E-UTRA); Multiplexing and channel coding (Release 12)," Technical Specification 36.212, Version 12.3.0, 3GPP Organizational Partners, Dec. 2014, 89 pages.
(Continued)

*Primary Examiner* — Chuong T Ho
(74) *Attorney, Agent, or Firm* — Sage Patent Group

(57) ABSTRACT

The present disclosure pertains to a method for operating a network node for a wireless communication network. The method comprising determining and/or adjusting a modulation, and/or a number of symbols Q' used for modulation, for HARQ/ACK transmission by a terminal based on a number of DL carriers configured for the terminal. The method further comprises configuring the terminal with the determined and/or adjusted modulation using RRC signaling. There are also discussed related methods and devices.

4 Claims, 9 Drawing Sheets

(51) Int. Cl.
*H04L 1/00* (2006.01)
*H04L 5/00* (2006.01)

(58) Field of Classification Search
USPC .................................................. 370/329, 330
See application file for complete search history.

(56) References Cited

U.S. PATENT DOCUMENTS

2016/0066282 A1* 3/2016 Ouchi ..................... H04L 5/00
455/522
2016/0323912 A1* 11/2016 Nakamura ............ H04L 1/0026
2017/0257191 A1* 9/2017 Seo ..................... H04W 74/002

OTHER PUBLICATIONS

Author Unknown, "Technical Specification Group Radio Access Network; Evolved Universal Terrestrial Radio Access (E-UTRA); Physical layer procedures (Release 11)," Technical Specification 36.213, Version 11.10.0, 3GPP Organizational Partners, Mar. 2015, 182 pages.

Sharp, "R1-110274: Concatenation of Dual RM Coding Bits for UCI on PUSCH," 3rd Generation Partnership Project (3GPP), TSG RAN WG1 Meeting #63bis, Jan. 17-21, 2011, 7 pages, Dublin, Ireland.

International Search Report and Written Opinion for International Patent Application No. PCT/SE2016/050096, dated May 3, 2016, 8 pages.

\* cited by examiner

IMPLEMENTATION OF HARQ ON PUSCH FOR MULTIPLE CARRIERS

This application is a 35 U.S.C. § 371 national phase filing of International Application No. PCT/SE2016/050096, filed Feb. 9, 2016, which claims the benefit of U.S. Provisional Application No. 62/113,745, filed Feb. 9, 2015, the disclosures of which are incorporated herein by reference in their entireties.

TECHNICAL FIELD

The present disclosure pertains to wireless communication technology, in particular in the context of multi-carrier use, e.g. carrier aggregation.

BACKGROUND

In wireless communication systems, the use of multiple carriers becomes more widespread, as one way to significantly increase possible data transmission rates and throughput. Using more and more carriers increases the amount of necessary control and feedback signaling, in particular for HARQ processes.

SUMMARY

It is an object of the present disclosure to provide approaches facilitating to limit signaling overhead for HARQ transmissions in particular in scenarios with multiple DL carriers.

Accordingly, there is suggested a method for operating a network node for a wireless communication network. The method comprises determining and/or adjusting a modulation, and/or a number of symbols Q' used for modulation, for HARQ/ACK transmission by a terminal based on a number of DL carriers configured for the terminal. The method further comprises configuring the terminal with the determined and/or adjusted modulation using RRC signaling.

There is also described a network node for a wireless communication network. The network node is adapted for determining and/or adjusting a modulation, and/or a number of symbols Q' used for modulation, for HARQ/ACK transmission by a terminal based on a number of DL carriers configured for the terminal. The network node further is adapted for configuring the terminal with the determined and/or adjusted modulation using RRC signaling.

A method for operating a terminal for a wireless communication network is also considered. The method comprises configuring the terminal, based on received, via RRC signaling, allocation data indicating a modulation, and/or a number of symbols Q' used for modulation, for HARQ/ACK transmission for a number of carrier aggregated DL carriers configured for the terminal.

Moreover, a terminal for a wireless communication network is proposed. The terminal is adapted for configuring itself, based on received, via RRC signaling, allocation data indicating a modulation, and/or a number of symbols Q' used for modulation, for HARQ/ACK transmission for a number of carrier aggregated DL carriers configured for the terminal.

Furthermore, there is described a program product comprising code executable by control circuitry. The code causes the control circuitry to carry out and/or control any of the methods described herein if executed on the control circuitry.

There is also suggested a carrier medium carrying and/or storing a program product as described herein and/or code executable by control circuitry, the code causing the control circuitry to perform and/or control any of the methods described herein.

The presented approaches allow controlling the HARQ/ACK feedback depending on the number of DL carriers, in particular facilitating low overhead, e.g. by choosing suitable modulation parameters for the HARQ/ACK transmissions, e.g. the number Q'.

BRIEF DESCRIPTION OF THE DRAWINGS

The drawings are provided to illustrate concepts and approaches of the disclosure and are not intended as limitation. The drawings comprise.

DETAILED DESCRIPTION

The use of LTE carrier aggregation (CA), introduced in Rel-10 and enhanced in Rel-11, provides means to increase the peak data rates, system capacity and user experience by aggregating radio resources from multiple carriers that may reside in the same band or different bands and, for the case of inter-band TDD CA, may be configured with different UL/DL configurations. In Rel-12, carrier aggregation between TDD and FDD serving cells is introduced to support UE connecting to them simultaneously. The concepts described herein are of particular use for LTE carrier aggregation, but may also be relevant for other RAT supporting CA.

In Rel-13, LAA (Licensed-Assisted Access) has attracted a lot of interest in extending the LTE carrier aggregation feature towards capturing the spectrum opportunities of unlicensed spectrum in the 5 GHz band. WLAN operating in the 5 GHz band nowadays already supports 80 MHz in the field and 160 MHz is to follow in Wave 2 deployment of IEEE 802.11ac.

There are also other frequency bands, such as 3.5 GHz, where aggregation of more than one carrier on the same band is possible, in addition to the bands already widely in use for LTE. Enabling the utilization of at least similar bandwidths for LTE in combination with LAA as IEEE 802.11ac Wave 2 will support calls for extending the carrier aggregation framework to support more than 5 carriers. The extension of the CA framework beyond 5 carriers was approved to be one work item for LTE Rel-13. The objective is to support up to 32 carriers in both UL and DL.

Compared to single-carrier operation, a UE operating with CA has to report feedback for more than one DL component carriers. Meanwhile, a UE does not need to support DL and UL CA simultaneously. For instance, the first release of CA capable UEs in the market only supports DL CA but not UL CA. This is also the underlying assumption in the 3GPP RAN4 standardization. Therefore, an enhanced UL control channel, i.e. PUCCH format 3 was introduced for CA during Rel-10 timeframe. However, in order to support more component carriers in Rel-13, the UL control channel capacity becomes a limitation.

HARQ and/or CSI feedback over UL SCH data is described in the following. HARQ feedback may also be referred to as HARQ/ACK feedback and/or HARQ/ACK transmissions. It may be considered that HARQ/ACK feedback and/or transmission comprise ACK and/or NACK signals, as demanded or prescribed by the corresponding HARQ process. HARQ/ACK transmission may generally comprise ACK and/or NACK bits.

Figure 1:
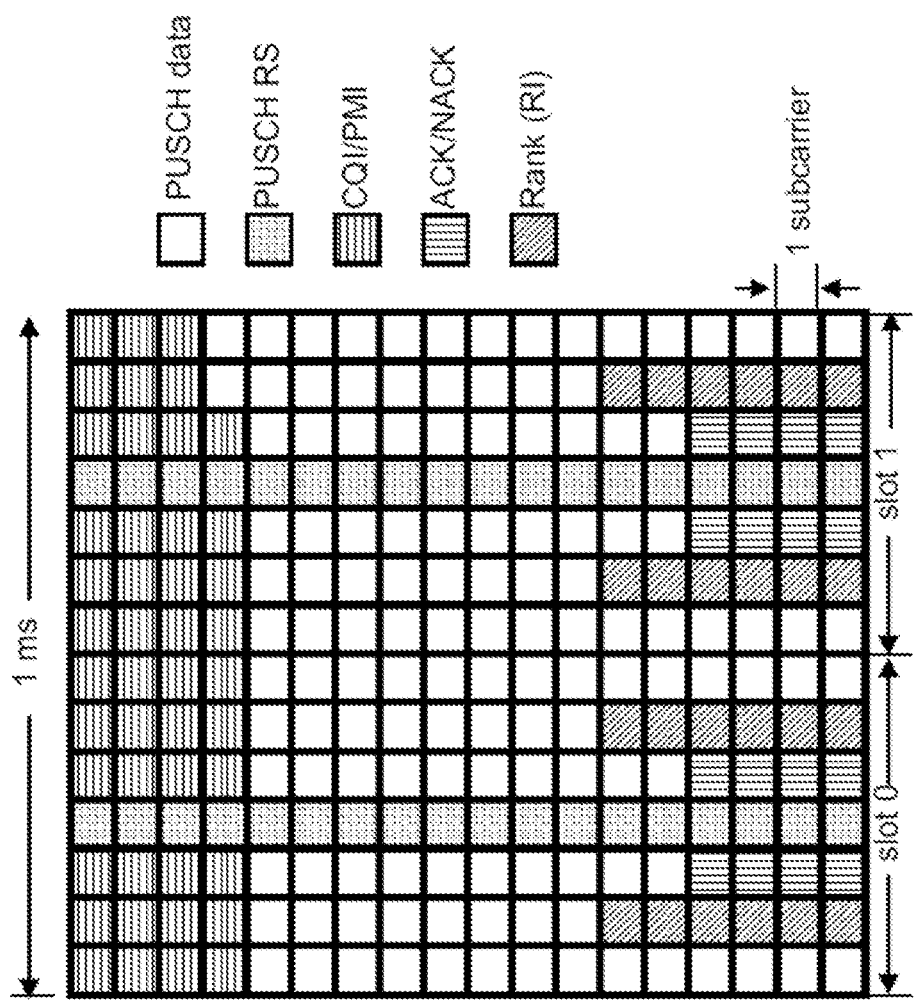
FIG. 1, showing multiplexing of control signaling with UL-SCH data.

When UCI is to be transmitted in a subframe in which the UE has been allocated transmission resources for the PUSCH, the UCI is multiplexed together with the UL-SCH data prior to DFT spreading, in order to preserve the low CM single-carrier property; the PUCCH is never transmitted in the same subframe as the PUSCH in Releases 8 and 9. The multiplexing of CQI/PMI, HARQ ACK/NACK, and RI with the PUSCH data symbols onto uplink resource elements (REs) is shown in FIG. 1.

The number of REs used for ACK/NACK is based on the MCS assigned for $\beta_{offset}^{HARQ-ACK}$, which is semi-statically configured by higher-layer signaling. The HARQ ACK/NACK resources are mapped to SC-FDMA symbols by puncturing the UL-SCH PUSCH data. Positions next to the RS are used, so as to benefit from the best possible channel estimation. The maximum amount of resource for HARQ ACK/NACK is 4 SC-FDMA symbols. The coded RI symbols are placed next to the HARQ ACK/NACK symbol positions irrespective of whether ACK/NACK is actually present in a given subframe. The modulation of the 1- or 2-bit ACK/NACK or RI is such that the Euclidean distance of the modulation symbols carrying ACK/NACK and RI is maximized. The outermost constellation points of the higher-order 16/64-QAM PUSCH modulations are used, resulting in increased transmit power for ACK/NACK/RI relative to the average PUSCH data power.

In 3GPP TS36.212, the channel coding of control information is specified in 5.2.2.6 where the number of coded modulation symbols per layer Q' for HARQ are given by below equations.

For the case when only one transport block is transmitted in the PUSCH $$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad \text{(Equation 1)}$$

For the case when two transport blocks are transmitted in the PUSCH $$Q' = \max[\min(Q'_{temp}, 4 \cdot M_{sc}^{PUSCH}), Q'_{min}] \text{ with} \quad \text{(Equation 2)}$$

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil$$

The denotation of the parameters can be found in 3GPP TS36.212. In short, the number of coded modulation symbols per layer may depend on the number of HARQ-ACK bits O, HARQ-ACK offset $\beta_{offset}^{PUSCH}$ and the code rate on PUSCH. Note that HARQ-ACK offset $\beta_{offset}^{PUSCH}$ is signaled by a high layer index according to Table 8.6.3-1 in 3GPP TS 36.213, which is copied below. Generally, the HARQ-ACK offset may be mapped and/or represented by a corresponding value or parameter or index, e.g. $I_{offset}^{HARQ-ACK}$ or $I_{offset,MC}^{HARQ-ACK}$, which may be an index for mapping to a table, e.g. table 1 below.

Table 1 shows a mapping of HARQ-ACK offset values and the index signaled by higher layers (Table 1 corresponds to Table 8.6.3-1 in 3GPP TS 36.213)

| $I_{offset}^{HARQ-ACK}$ or $I_{offset,MC}^{HARQ-ACK}$ | $\beta_{offset}^{HARQ-ACK}$ |
|---|---|
| 0 | 2.000 |
| 1 | 2.500 |
| 2 | 3.125 |
| 3 | 4.000 |
| 4 | 5.000 |
| 5 | 6.250 |
| 6 | 8.000 |
| 7 | 10.000 |
| 8 | 12.625 |
| 9 | 15.875 |
| 10 | 20.000 |
| 11 | 31.000 |
| 12 | 50.000 |
| 13 | 80.000 |
| 14 | 126.000 |
| 15 | 1.0 |

HARQ-ACK bits for 32 DLCCs are discussed in the following.

The number of HARQ-ACK bits increases linearly with the number of aggregated DL carriers. When there are up to 32 configured DL CCs:

For FDD, there are up to 64 HARQ-ACK bits per TTI (Rank 2 transmission);

For TDD, the number of HARQ-ACK bits to be feedback depends on the number of configured CCs and UL/DL subframe configuration of the DL CCs. Assuming that there are 32 DL CCs with UL/DL subframe configuration 2 and transmission mode 3, there are up to 256 (32*4*2) HARQ-ACK bits.

Due to aggregation of a large number of DL carriers, the HARQ-ACK bits may increase significantly and occupy many resources on PUSCH. This may result in excessive puncturing on PUSCH, which affects the data transmissions on PUSCH.

One observation is that with few HARQ-ACK bits, a large value of $\beta_{offset}^{PUSCH}$ may be needed in order to perform DTX detection, in particular to determine of HARQ-ACK bits are included in the transmission or not. With increasing number of HARQ-ACK bits, the efforts and problems of performing DTX detection increase as well.

The reason is that since the number of symbols Q' is proportional to the number of HARQ-ACK bits, the number of possible transmission hypotheses for the DTX case grows faster than the number of allowed codewords for the non-DTX case. Thus when a fixed value of $\beta_{offset}^{PUSCH}$ is used independently of the number of HARQ-ACK bits, there will be inefficient use of PUSCH resources due to excessive puncturing.

There is disclosed an approach to adjust the number of HARQ-ACK resources on PUSCH in accordance with the number of configured DL carriers, in particular by determining and/or adjusting the HARQ-ACK offset $\beta_{offset}^{PUSCH}$ based on the number of configured DL carriers.

The transmission of HARQ-ACK on PUSCH may be improved with the approaches described herein, in particular for the case when there are a large number of DL carriers and hence many HARQ-ACK bits. The approaches provide robustness on HARQ-ACK transmission as well as better data transmission on PUSCH.

Generally, there is described a method for operating a network node comprising, and/or a network node adapted for and/or comprising a modulation module for, determining and/or adjusting a modulation, and/or a number of symbols Q' used for modulation, for HARQ/ACK transmission by a terminal based on a number of DL carriers configured for the terminal, in particular carriers configured for carrier aggregation (e.g. DL carrier aggregation). The method may comprise, and/or the network node may be adapted for and/or comprise a configuring module for, configuring the terminal for and/or with the determined and/or adjusted modulation. Generally, determining and/or adjusting may be considered to be based on a number of DL carriers if it takes into account the total number of carriers and/or a distribution of carriers into and/or number of carriers of different types (e.g. legacy/non-legacy and/or licensed and/or non-licensed).

Configuring the terminal may comprise sending, e.g. to the terminal and/or UE, allocation data, e.g. one or more parameters and/or values representing the modulation, and/or configuring may be performed in particular via RRC signaling and/or RRC communication or sending.

Moreover, there is disclosed a method for operating a terminal comprising, and/or a terminal adapted for and/or comprising a receiving module, comprising receiving allocation data indicating a modulation, and/or a number of symbols Q' used for modulation, for HARQ/ACK transmission (in particular for a number of DL carriers configured for the terminal, which may be carrier aggregated) by the terminal and/or configuring the terminal accordingly. The receiving and/or configuring may be performed via RRC signaling and/or RRC communication or sending.

In a variant, there may be considered a method for operating a network node comprising, and/or a network node adapted for and/or comprising an offset module for adjusting and/or determining a HARQ-ACK offset $\beta_{offset}^{PUSCH}$ (the offset or HARQ-ACK offset) and/or a value thereof and/or a value or parameter representing (e.g. allowing 1-to-1 mapping to) the offset (which may also be referred to as the offset) based on the number of configured DL carriers for a terminal.

Adjusting and/or determining the offset and/or the corresponding value may comprise determining and/or adjusting a parameter or value representing the offset, e.g. the index $I_{offset}^{HARQ-ACK}$ or $I_{offset,MC}^{HARQ-ACK}$ (the index), which may be represented on a table mapping the index to the offset or value. Determining and/or adjusting the offset may be seen as part of and/or implementation of determining and/or adjusting a modulation, and/or a number of symbols Q' used for modulation, for HARQ/ACK transmission by the terminal (as outlined herein, the modulation/Q' are dependent on the offset).

The method may comprise, and/or the network node may be adapted for and/or comprise a sending module for, sending, e.g. to the terminal and/or UE, a parameter and/or value representing the offset, in particular sending the index and/or a value representing the index, e.g. via RRC signaling. Such sending may be seen as part of and/or implemented as configuring the terminal.

Determining and/or adjusting the offset may generally be performed such that and/or include with increasing number of configured DL carriers (in a carrier aggregation for the terminal) and/or increasing number of HARQ-ACK bits to be transmitted (for the configured DL carriers), a decreasing (e.g. monotonous decreasing) HARQ-ACK offset is used.

It may generally be considered that determining and/or adjusting the offset may comprise obtaining the number of DL carriers configured for the terminal (e.g. for a carrier aggregation/aggregate). Obtaining data, e.g. the number of configured DL carriers, generally may comprise reading (e.g. from a memory and/or table) and/or receiving (e.g. from the network and/or another network node and/or the terminal) and/or determining (e.g. calculating based on available data, which may be read and/or received data). The network node may be adapted for such obtaining and/or comprise an obtaining module for such obtaining.

Generally, the (configured) DL carriers for a terminal may be the DL carriers provided and/or configured and/or used (e.g. by the network, in particular the network node) for carrier aggregation and/or for a carrier aggregate, in particular for a terminal and/or connecting to the terminal and/or connecting the terminal to the network, in particular to the network node.

The method may comprise providing, and/or the network node may comprise, e.g. stored in a memory, which may be accessible to control circuitry of the network node and/or the offset module, one or more different and/or pre-defined mapping tables, wherein each mapping table provides a mapping of an offset/offset value to an index; different table may provide different mappings. Determining and/or adjusting the offset may comprise choosing and/or selecting and/or determining one of the different tables to select and/or determine and/or adjust the offset (and/or corresponding index), in particular based on the number of DL carriers. A pre-defined mapping table may e.g. a mapping table stored and/or programmed into a memory, in particular in a static manner. Generally, a different mapping table may result from manipulating, and/or performing a mathematical transformation on, a pre-defined and/or given table (e.g. scaling by a given factor, for example multiplying each offset in a table with a constant factor, which may depend on the number of configured DL carriers). In particular, such manipulating may be performed such that the offset (e.g., the offset for each index) is smaller for larger numbers of configured DL carriers (e.g., for each index the corresponding offset in the different tables is smaller for the table/s associated to higher number of configured DL carriers).

In a variant, determining and/or adjusting the offset may comprise determining that and/or whether the number of configured DL carriers is above a predetermined threshold N, e.g. 5, and/or selecting a new and/or different and/or pre-defined mapping table of HARQ-ACK offset $\beta_{offset}^{PUSCH}$ value and index $I_{offset}^{HARQ-ACK}$ or $I_{offset,MC}^{HARQ-ACK}$, based on which the offset and/or index is determined and/or adjusted.

In one example, the mapping in current HARQ-ACK offset mapping table is scaled down by a factor of M, e.g., 2. In another example, the mapping table of RI offset Table 8.6.3-2 in 3GPP TS 36.213 is used for HARQ-ACK offset mapping. The motivation is to get a smaller value of HARQ-ACK offset than the ones defined in current HARQ-ACK offset mapping table for larger number of configured DL carriers.

Alternatively or additionally, a new equation other than Equation 1 and 2 may be used for calculating the number of coded modulated symbols Q'.

In one example, determining and/or adjusting a modulation, and/or a number of symbols Q' used for modulation, for HARQ/ACK transmission by a terminal may comprise determining the number of symbols Q' as a function of the number of configured DL carriers. In another example for the case when only one transport block is transmitted in the PUSCH, the number of symbols Q' may be given by and/or based upon Equation (A)

$$Q' = \min\left(\left\lceil\frac{O^y \cdot M_{sc}^{PUSCH-initial} \cdot N_{symb}^{PUSCH-initial} \cdot \beta_{offset}^{PUSCH}}{\sum_{r=0}^{C-1} K_r}\right\rceil, 4 \cdot M_{sc}^{PUSCH}\right)$$

where the exponent y gives the slope of how much Q' is increased when the number of HARQ-ACK bits is increased. Determining and/or adjusting a modulation, and/or a number of symbols Q' used for modulation, for HARQ/ACK transmission by a terminal may be based on Equation (A) and/or comprise using Equation (A).

In a further alternative or additional variant, determining and/or adjusting a modulation, and/or a number of symbols Q' used for modulation, for HARQ/ACK transmission by a terminal may comprise using different equations based on the number of configured DL carriers (for the terminal/in CA). For example, a new equation (e.g. Equation A) may be used when the number of configured carriers is above a predetermined threshold N, e.g. 5; otherwise the legacy equation (i.e., Equation 1 and 2) may be used.

Alternatively or additionally, determining and/or adjusting a modulation, and/or a number of symbols Q' used for modulation, for HARQ/ACK transmission by a terminal may comprise performing and/or determining encoding of HARQ-ACK information and/or feedback based on the number of configured DL carriers. For example, HARQ-ACK information/feedback may be encoded in more than one format depending on which carriers and/or the number of DL carriers configured in DL. If the carriers that are configured belong to a legacy set of carriers (and/or a number of carriers up to 5), the HARQ-ACK bits may be coded according to the current legacy method in 3GPP. The size of the legacy set of carriers could be limited to N e.g. 5. The encoding may use the current legacy method in order to derive the number of symbols Q'.

If at least one carrier is configured which does not belong to the legacy set of carriers, encoding the HARQ-ACK information/feedback may be performed and/or determined in an extended format. The extended format may be determined and/or defined to be able to carry more HARQ-ACK bits (than the legacy format), e.g. up to 256 bits, as in the example above. In another example, if the carriers that are configured are licensed carriers, the HARQ-ACK bits are coded according to the current legacy method in 3GPP; if the carriers that are configured are unlicensed carriers, the HARQ-ACK information is encoded in an extended format which can carry more HARQ-ACK bits.

Alternatively or additionally, HARQ-ACK information is encoded in more than one format depending on which carriers are scheduled in DL. If the carriers that are scheduled belong to a legacy set of carriers, the HARQ-ACK bits are coded according to the current legacy method in 3GPP. The size of the legacy set of carriers could be limited to N e.g. 5. The encoding may use the current legacy method in order to derive the number of symbols Q'.

If at least one carrier is scheduled which does not belong to the legacy set of carriers, the HARQ-ACK information is encoded in an extended format. The extended format may be determined and/or defined to be able to carry more HARQ-ACK bits, e.g. up to 256 bits as in the example above.

In the RBS, blind detection is done to determine whether the terminal or UE has encoded the HARQ-ACK information using the legacy encoding or the extended encoding. The blind decoding may be performed as the UE might have missed control information in DL and then transmit with legacy encoding even if extended encoding was expected based on the scheduled carriers. In another example, if the carriers that are configured are licensed carriers, the HARQ-ACK bits are coded according to the current legacy method in 3GPP; if the carriers that are configured are unlicensed carriers, the HARQ-ACK information is encoded in an extended format which can carry more HARQ-ACK bits.

There may be considered a method for operating a network node, and/or a network node adapted for and/or comprising a blind detection module for, performing blind detection on HARQ/ACK feedback received from a terminal based on at least two different modulations. The modulations may differ regarding a number of symbols Q' used for modulation and/or an encoding and/or a format, e.g. an extended format, which may comprise the number of bits to modulate. The modulations to be used may be determined based on the number of DL carriers configured for the terminal (and/or for DL carrier aggregation). One of the modulations may be a legacy modulation and/or a modulation determined for up to 5 DL carriers and/or based on table 1, the other modulation may be based on a number of DL carriers larger than the legacy number and/or larger than 5 and/or corresponding to a number of DL carriers configured, which may be larger than 5 and/or a legacy number. The modulations and/or data representing the modulations may be stored in a memory of the network node and/or be obtained by the network node, e.g. read and/or received, e.g. from a network and/or another network node and/or a terminal. The method and/or network node may be a network node as described herein, e.g. in regards to determining and/or adjusting the modulation of the terminal. One of the modulations used for blind detection may be a modulation for HARQ/ACK information and/or feedback determined and/or adjusted and/or configured to the terminal by network node (or the network or another network node, which may transmit and/or communicate corresponding data/information to the network node) according to any of the variants described herein.

There is generally suggested to (for modulation of HARQ-ACK):
  Adjust the number of HARQ-ACK symbols on PUSCH in accordance with the number of configured DL carriers and/or
  Use a new equation to calculate the number of HARQ-ACK symbols on PUSCH so that it is not scaled linearly with the number of HARQ-ACK bits and/or
  Use different formats to transmit HARQ-ACK feedback for carriers belonging to different sets Generally, the number of DL carriers (e.g. configured for or to the terminal), which may be configured in particular for CA (in particular, DL CA), in particular may be larger than 2, larger than 5, larger than 10 and/or 32 or less, and/or in particular may be between (including the borders) 6 and 32.

Figure 2:
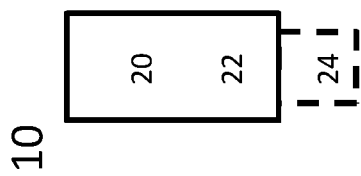
FIG. 2, schematically showing a terminal.

FIG. 2 schematically shows a terminal 10, which may be implemented in this example as a user equipment. Terminal 10 comprises control circuitry 20, which may comprise a controller connected to a memory. A receiving module and/or transmitting module and/or control or processing module and/or CIS receiving module and/or scheduling module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry. Modules of a terminal as described herein may be implemented in software and/or hardware and/or firmware in corresponding circuitry.

Figure 3:
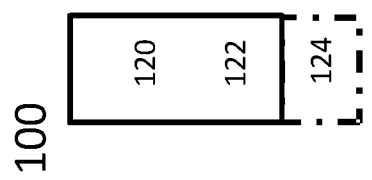
FIG. 3, schematically showing a network node.

FIG. 3 schematically show a network node or base station 100, which in particular may be an eNodeB. Network node 100 comprises control circuitry 120, which may comprise a controller connected to a memory. A receiving module and/or transmitting module and/or control or processing module and/or scheduling module and/or modulation and/or configuring module, may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. Modules of a network node as described herein may be implemented in software and/or hardware and/or firmware in corresponding circuitry.

Figure 4:
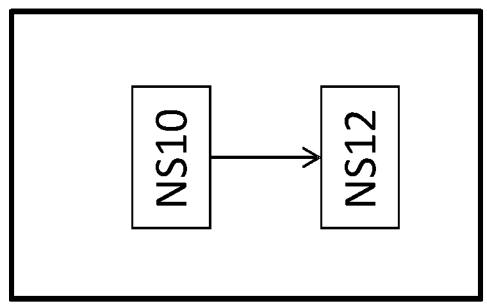
FIG. 4, showing a flowchart of a method for operating a network node.

FIG. 4 shows a flowchart of a method for operating a network node for a wireless communication network. The network node may be any of the network nodes described herein. The method comprises an action NS10 of determining and/or adjusting a modulation, and/or a number of symbols Q' used for modulation, for HARQ/ACK transmission by a terminal based on a number of DL carriers configured for the terminal. The method further comprises an action NS12 of configuring the terminal with the determined and/or adjusted modulation using RRC signaling.

Figure 5:
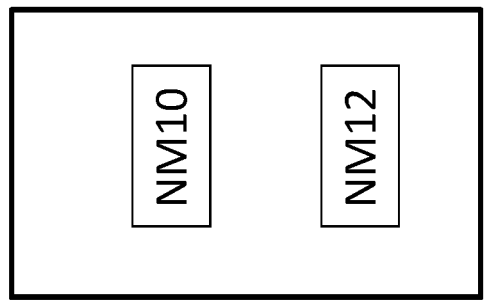
FIG. 5, schematically showing a network node.

FIG. 5 schematically shows a network node for a wireless communication network. The network node may be any of the network nodes described herein. The network node comprises a determining module NM10 for performing action NS10. The network node further comprises a configuring module NM12 for performing action NS12.

Figure 6:
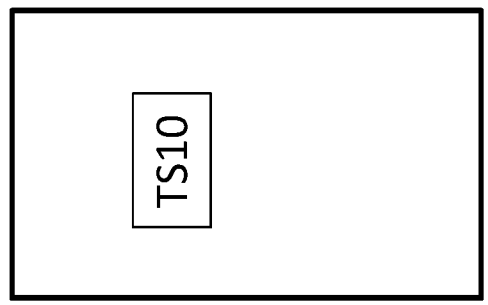
FIG. 6, showing a flowchart of a method for operating a terminal.

FIG. 6 shows a flowchart of a method for operating a terminal for a wireless communication network. The terminal may be any of the terminals described herein. The method comprises an action TS10 of configuring the terminal, based on received, via RRC signaling, allocation data indicating a modulation, and/or a number of symbols Q' used for modulation, for HARQ/ACK transmission for a number of carrier aggregated DL carriers configured for the terminal. The terminal may perform action TS10 to configure itself.

Figure 7:
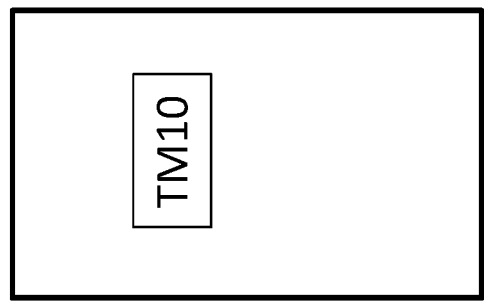
FIG. 7, schematically showing a terminal.

FIG. 7 schematically shows a terminal for a wireless communication network. The terminal may be any of the network nodes described herein. The terminal comprises a determining module TM10 for performing action TS10.

Figure 8:
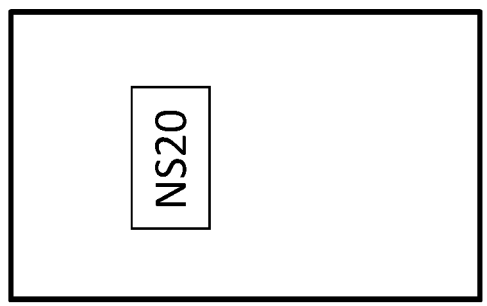
FIG. 8, showing a flowchart of a method for operating a network node.

FIG. 8 shows a flowchart of a method for operating a network node for a wireless communication network. The network node may be any of the network nodes described herein. The method comprises an action NS20 of performing blind detection on HARQ/ACK feedback received from a terminal based on at least two different modulations.

Figure 9:
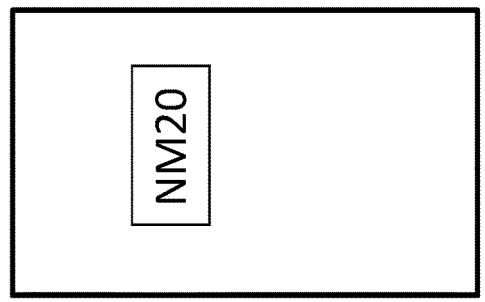
FIG. 9, schematically showing a network node.

FIG. 9 schematically shows a network node for a wireless communication network. The network node may be any of the network nodes described herein. The network node comprises a blind detection module NM20 for performing action NS20.

Generally, carrier aggregation (CA) may refer to the concept of a radio connection and/or communication link between a wireless and/or cellular communication network and/or network node and a terminal comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. called primary component carrier or PCC), over which control information may be transmitted, wherein the control information may refer to the primary carrier and other carriers, which may be referred to as secondary carriers (or secondary component carrier, SCC).

Control information may comprise scheduling information and/or allocation data and/or HARQ signaling, in particular in regards to a DL connection. A communication link may comprise an UL connection and/or a DL connection. It may be considered that a communication link comprise different carriers and/or carrier aggregations for UL and/or DL; in particular, it may be considered that a communication link comprises one or more carriers and/or carrier aggregations for DL and a different number of carriers and/or carrier aggregations for UL, which may use different frequencies than the DL carriers.

Carriers in a carrier aggregation may comprise carrier/s in a licensed spectrum and/or carrier/s in an unlicensed spectrum. In particular, carrier/s of an unlicensed spectrum may be secondary carriers of a carrier aggregation. It may be considered that primary carriers are in a licensed spectrum. Generally, before accessing a carrier in an unlicensed spectrum for transmission, a listen-before-talk (LBT) procedure may be performed, e.g. by a correspondingly adapted terminal or network node. Carriers of a carrier aggregation may belong to different frequency bands, e.g. as defined in a given standard as LTE and/or in terms of frequency and/or spectral width, and/or whether they are licensed or not. Different carriers may be associated to different frequency bands; it may be considered that different frequency bands have different carriers (one or more than one carrier per frequency band may generally be envisaged) associated to them. Licensed bands or spectra may have different frequency bands than unlicensed bands or spectra. A control carrier may be a primary carrier used for control information transmission, e.g. for the transmission of HARQ feedback and/or for CSI information and/or scheduling requests. Generally, a DL carrier aggregation may comprise more than 2, more particular more than 5, in particular between 6 and 32 carriers (including the boundary values).

There may be considered a network node adapted for performing any one of the methods for operating a network node described herein and/or for configuring a terminal as described herein.

There may be considered a terminal adapted for performing any one of the methods for operating a terminal described herein and/or for performing bundling as described herein, in particular according to a configuration configured by a network or network node or system.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a storage medium or carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

An uplink carrier may generally be or indicate a carrier and/or frequency band intended and/or used for uplink transmissions.

A downlink carrier may generally be or indicate a carrier and/or frequency band intended and/or used for downlink transmissions.

A terminal being configured with a cell and/or carrier may be in a state in which it may communicate (transmit and/or receive data) using the cell or carrier, e.g. being registered with the network for communication and/or being synchronized to the cell and/or carrier.

Generally, a node being connected or connectable to a terminal with and/or via a cell or carrier may be adapted for communicating and/or communicate with the terminal using this cell or carrier and/or comprise a corresponding communication link. A terminal being connected or connectable to a network with a cell or carrier may be adapted for communicating and/or communicate with the terminal using this cell or carrier. Connection to a network may refer to connection to at least one node of the network.

Data may refer to any kind of data, in particular any one of and/or any combination of control data or user data or payload data. Control data may refer to data controlling and/or scheduling and/or pertaining to the process of data transmission and/or the network or terminal operation.

Receiving or transmitting on a cell or carrier may refer to receiving or transmitting utilizing a frequency (band) or spectrum associated to the cell or carrier.

A wireless communication network may comprise at least one network node, in particular a network node as described herein. A terminal connected or communicating with a network may be considered to be connected or communicating with at least one network node, in particular any one of the network nodes described herein.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry.

Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or base station and/or relay node and/or any device generally adapted for communication in a wireless communication network, in particular cellular communication.

A modulation for HARQ/ACK transmission may comprise a number of symbols Q' used for modulation and/or an encoding and/or a format, e.g. an extended format, which may comprise the number of bits to modulate. Allocation data pertaining to modulation may comprise data indicating (e.g. to a terminal), a number of symbols Q' to be used for modulation and/or an encoding and/or a format, e.g. an extended format, which may comprise the number of bits to modulate.

A cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microcontroller and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN.

A network node may be a base station, which may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two user equipments.

It may be considered for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands. A network node, e.g. a base station or eNodeB, may be adapted to provide and/or define and/or control one or more cells, e.g. a PCell and/or a LA cell.

A network node, in particular a base station, and/or a terminal, in particular a UE, may be adapted for communication in spectral bands (frequency bands) licensed and/or defined for LTE. In addition, a network node, in particular a base station/eNB, and/or a terminal, in particular a UE, may be adapted for communication in freely available and/or unlicensed/LTE-unlicensed spectral bands (frequency bands), e.g. around 5 GHz.

Configuring a terminal or wireless device or node may involve instructing and/or causing the wireless device or node to change its configuration, e.g. at least one setting and/or register entry and/or operational mode. A terminal or wireless device or node may be adapted to configure itself, e.g. according to information or data in a memory of the terminal or wireless device and/or based on corresponding allocation data and/or configuration date, which may be received, e.g. from a network node, which may be a controlling or configuring node. Configuring a node or terminal or wireless device by another device or node or a network may refer to and/or comprise transmitting information and/or data and/or instructions to the wireless device or node by the other device or node or the network, e.g. allocation data and/or scheduling data and/or scheduling grants. Configuring a terminal may include sending allocation data to the terminal indicating which modulation and/or encoding and/or which DL carriers to use.

A modulation of and/or modulating HARQ/ACK information/feedback may include an encoding and/or performing encoding. Allocation data configuring or indicating a modulation may include an indication which encoding to use for HARQ/ACK information/feedback. The term modulation may be used to refer to data (e.g. allocation data) representing and/or indicating the modulation used and/or to be used by a terminal.

A wireless communication network may comprise a radio access network (RAN), which may be adapted to perform according to one or more standards, in particular LTE, and/or radio access technologies (RAT).

A network device or node and/or a wireless device may be or comprise a software/program arrangement arranged to be executable by a hardware device, e.g. control circuitry, and/or storable in a memory, which may provide the described functionality and/or corresponding control functionality.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or network node, may be adapted to determine and/or transmit corresponding allocation data indicating release or de-allocation of resources to one or more wireless devices, in particular to a first wireless device.

Allocation data may be considered to be data indicating and/or granting resources allocated by the controlling or allocation node, in particular data identifying or indicating which resources are reserved or allocated for communication for a wireless device and/or which resources a wireless device may use for communication and/or data indicating a resource grant or release. A grant or resource or scheduling grant may be considered to be one example of allocation data. Allocation data may in particular comprise information and/or instruction regarding a configuration and/or for configuring a terminal, e.g. indicating a modulation to use, which may comprise an encoding and/or a number of symbols Q' to be used. Such information may comprise e.g. information about which carriers (and/or respective HARQ feedback) to bundle, bundle size, method to bundle (e.g. which operations to perform, e.g. logical operations), etc., in particular information pertaining to and/or indicating the embodiments and methods described herein.

It may be considered that an controlling node or configuring node or allocation node or network node is adapted to transmit allocation data directly to a node or wireless device and/or indirectly, e.g. via a relay node and/or another node or base station. Allocation data may comprise control data and/or be part of or form a message, in particular according to a pre-defined format, for example a DCI format, which may be defined in a standard, e.g. LTE. Allocation data may comprise configuration data, which may comprise instruction to configure and/or set a user equipment for a specific operation mode, e.g. in regards to the use of receiver and/or transmitter and/or transceiver and/or use of transmission (e.g. TM) and/or reception mode, and/or may comprise scheduling data, e.g. granting resources and/or indicating resources to be used for transmission and/or reception. A scheduling assignment may be considered to represent scheduling data and/or be seen as an example of allocation data. A scheduling assignment may in particular refer to and/or indicate resources to be used for communication or operation. Allocation or configuration data may indicate or configure carriers for carrier aggregation for a terminal. A terminal configured with carrier aggregation and/or DL carriers may be configured to use the carriers of the aggregate, and/or the DL carriers (in particular as an aggregate). In particular, it may be configured to receive (and/or demodulate and/or decode) signals on the DL carriers.

HARQ ACK/NACK (acknowledge for a correctly received block of data, not acknowledged for a not correctly received block of data) feedback may refer to feedback (e.g. a corresponding signal transmitted, which may comprise 1 or more bits) provided (e.g. on the UL) by a terminal, e.g. to a network or network node in response to data transmitted to it (e.g. on the DL). HARQ ACK/NACK information or feedback (or shorter HARQ-ACK information or feedback or HARQ information or feedback or just HARQ) may include transmitting a signal/bot indicating whether a transport block of data received by the terminal has been receiver correctly or not. HARQ and/or determining HARQ may include decoding and/or error detection procedures to determine correct reception. There may be defined a number of HARQ processes with associated HARQ ids or numbers, which may refer to individual data streams; a HARQ response or feedback from a terminal (e.g. a HARQ bit) may be associated to one of the HARQ processes or ids. In some variant, HARQ feedback may comprise one bit per DL carrier; in other variant, HARQ feedback may comprise two (or more than two) bits per carrier, e.g. dependent on the rank used. Generally, HARQ feedback may be transmitted (and/or determined, e.g. based on received signals and/or transport blocks and/or data and/or HARQ process identifiers) by a terminal, and/or a terminal may be adapted for, and/or comprise a HARQ module for, determining (e.g., as mentioned above) and/or transmitting HARQ feedback, in particular based on and/or using a configuration and/or a modulation configured, e.g. a modulation determined and/or configured as described herein. Transmitting HARQ may generally be performed on a UL control channel, e.g. PUSCH.

Adjusting a modulation, and/or a number of symbols Q' used for modulation, for HARQ/ACK transmission may comprise determining the modulation, and/or a number of symbols Q' used for modulation, for HARQ/ACK transmission. Determining and/or adjusting a value or condition may generally comprise determining and/or setting the value or condition, either from a status in which the value or condition is not set or changing an already set value or condition (setting, e.g., for configuring the set value or condition).

Q' generally may be the number of coded modulation symbols per layer Q' for HARQ.

Determining and/or adjusting a value or condition or parameter or modulation and/or a number of symbols Q' used for modulation may comprise obtaining, e.g. reading from a memory (e.g. a buffer or register) and/or receiving, information regarding and/or indicating the number of DL carriers configured for the terminal. The information may be present in a memory (e.g., a buffer or register) or received as a signal, e.g. from circuitry of the network node and/or from another network node. The information may be stored in a table and/or be based on a standard, e.g. LTE or an LTE-related standard. Determining and/or adjusting the modulation or Q' may comprise estimating and/or calculating, e.g. according to an equation (like equations 1 or 2), and/or reading from a memory (e.g. buffer or register) and/or table, e.g. based on the information indicating the number of DL carriers the terminal is configured with. Determining and/or adjusting, in particular estimating and/or calculating, may comprise selecting between or from two or more different equations based on the number of DL carriers and/or selecting between or from two or more tables based on the number of DL carriers. The network node may be adapted for, and/or comprise an aggregation module for, and/or perform configuring the terminal with the carriers in carrier aggregation, in particular the DL carriers. The terminal may be adapted for, and/or comprise an aggregation module for, and/or perform configuring itself for carrier aggregation, e.g. based on configuring performed by the network node and/or based on received corresponding allocation data.

RRC refers to a protocol (or protocol layer or level) of the protocol stack, e.g. for LTE or UMTS (Universal Mobile Telecommunication System), representing a control plane. RRC signaling is considered higher-level signaling (higher than, e.g. physical layer signaling) and may be associated to Layer 3 (L3). Configuring a terminal may comprise RRC signaling. RRC signaling generally may comprise transmitting one or more RRC messages.

Some useful abbreviations include:
3GPP 3rd Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CCA Clear Channel Assessment
CIS Transmission Confirmation Signal
CoMP Coordinated Multiple Point Transmission and Reception
CQI Channel Quality Information
CRS Cell-specific Reference Signal
CSI Channel State Information
CSI-RS CSI reference signal
D2D Device-to-device
DCI Downlink Control Information Downlink; generally referring to transmission of data to a node/into a direction further away from network core (physically and/or logically); in particular from a base station or eNodeB terminal; more generally, may refer to transmissions received by a terminal or node (e.g. in a D2D environment);
DL often uses specified spectrum/bandwidth different from UL (e.g. LTE FD
DMRS Demodulation Reference Signals
DRS Discovery Reference Signal
eNB evolved NodeB, base station
eNB evolved NodeB; a form of base station, also called eNodeB
EPDCCH Enhanced Physical DL Control CHannel
E-UTRA/N Evolved UMTS Terrestrial Radio Access/Network, an example of a RAT
FDD Frequency Division Duplexing
HARQ Hybrid Automatic Repeat reQuest
ID Identity
L1 Layer 1
L2 Layer 2
LA Licensed Assisted
LA Licensed Assisted Access
LBT Listen-before-talk
LTE Long Term Evolution, a telecommunications standard
MAC Medium Access Control
MBSFN Multiple Broadcast Single Frequency Network
MCS Modulation and Coding Scheme
MDT Minimisation of Drive Test
NW Network
O&M Operational and Maintenance
OFDM Orthogonal Frequency Division Multiplexing
OSS Operational Support Systems
PC Power Control
PCFICH Physical Control Format Indicator Channel
PDCCH Physical Downlink Control Channel
PDCCH Physical DL Control CHannel
PH Power Headroom
PHR Power Headroom Report
PMI Precoding Matrix Indicator
PRB Physical Resource Block
PSS Primary Synchronization Signal
PUCCH Physical Uplink Control Channel
PUSCH Physical Uplink Shared Channel
PUSCH Physical Uplink Shared CHannel RA Random Access
RACH Random Access CHannel
RAT Radio Access Technology
RB Resource Block
RE Resource Element
RI Rank Indicator
RRC Radio Resource Control
RRH Remote radio head
RRM Radio Resource Management
RRU Remote radio unit
RSRP Reference signal received power
RSRQ Reference signal received quality
RSSI Received signal strength indicator
RX reception/receiver, reception-related
SA Scheduling Assignment
SCell Secondary Cell
SFN Single Frequency Network
SINR/SNR Signal-to-Noise-and-Interference Ratio; Signal-to-Noise Ratio
SON Self Organizing Network
SR Scheduling Request
SRS Sounding Reference Signal
SSS Secondary Synchronization Signal
TDD Time Division Duplexing
TPC Transmit Power Control
TTI Transmission-Time Interval
TX transmission/transmitter, transmission-related
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency; generally, UL may refer to transmission by a terminal (e.g. to a network or network node or another terminal, for example in a D2D context).

These and other abbreviations may be used according to LTE standard definitions.

The invention claimed is:

1. A method for operating a network node for a wireless communication network, the method comprising:
   determining a number of symbols Q' used for modulation, for Hybrid Automatic Repeat Request/Acknowledgment (HARQ/ACK) transmission by a terminal based on a number of downlink (DL) carriers configured for the terminal, wherein determining the number of symbols Q' comprises determining an HARQ-ACK offset ($\beta_{offset}^{PUSCH}$) based on the number of DL carriers configured for the terminal, and
   wherein when only one transport block is transmitted in Physical Uplink Shared Channel (PUSCH), the number of symbols Q' is based on:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$

wherein when two transport blocks are transmitted in the PUSCH, the number of symbols Q' is based on:

$$Q' = \max[\min(Q'_{temp}, 4 \cdot M_{sc}^{PUSCH}), Q'_{min}]$$

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil$$

configuring the terminal with the determined number of symbols Q' used for modulation using Radio Resource Control (RRC) signaling.

2. A network node for a wireless communication network, the network node being adapted for:
   determining a number of symbols Q' used for modulation, for Hybrid Automatic Repeat Request/Acknowledgment (HARQ/ACK) transmission by a terminal based on a number of downlink (DL) carriers configured for the terminal, wherein determining the number of symbols Q' comprises determining an HARQ-ACK offset ($\beta_{offset}^{PUSCH}$) based on the number of DL carriers configured for the terminal, and
   wherein when only one transport block is transmitted in Physical Uplink Shared Channel (PUSCH), the number of symbols Q' is based on:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$

wherein when two transport blocks are transmitted in the PUSCH, the number of symbols Q' is based on:

$$Q' = \max[\min(Q'_{temp}, 4 \cdot M_{sc}^{PUSCH}), Q'_{min}]$$

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil$$

configuring the terminal with the determined and/or adjusted number of symbols Q' used for modulation using Radio Resource Control (RRC) signaling.

3. A method for operating a terminal for a wireless communication network, the method comprising:
   configuring the terminal, based on received, via Radio Resource Control (RRC) signaling, a number of symbols Q' used for modulation, for Hybrid Automatic Repeat Request/Acknowledgment (HARQ/ACK) transmission for a number of carrier aggregated downlink (DL) carriers configured for the terminal, wherein the number of symbols Q' are determined by determining an HARQ-ACK offset ($\beta_{offset}^{PUSCH}$) based on the number of DL carriers configured for the terminal, and wherein when only one transport block is transmitted in Physical Uplink Shared Channel (PUSCH), the number of symbols Q' is based on:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$

wherein when two transport blocks are transmitted in the PUSCH, the number of symbols Q' is based on:

$$Q' = \max[\min(Q'_{temp}, 4 \cdot M_{sc}^{PUSCH}), Q'_{min}]$$

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil.$$

4. A terminal for a wireless communication network, the terminal comprising: a processor and a memory, configured to, based on received, via Radio Resource Control (RRC) signaling, a number of symbols Q' used for modulation, for Hybrid Automatic Repeat Request/Acknowledgment (HARQ/ACK) transmission for a number of carrier aggregated downlink (DL) carriers configured for the terminal, wherein the number of symbols O' are determined by determining an HARQ-ACID offset (PpffsJt) based on the number of DL carriers configured for the terminal, and wherein when only one transport block is transmitted in Physical Uplink Shared Channel (PUSCH), the number of symbols Q' is based on:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$

wherein when two transport blocks are transmitted in the PUSCH, the number of symbols Q' is based on:

$$Q' = \max[\min(Q'_{temp}, 4 \cdot M_{sc}^{PUSCH}), Q'_{min}]$$

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil.$$

\* \* \* \* \*